Dec. 7, 1965   W. H. HOGAN ETAL   3,221,551
LIQUID LEVEL GAGE FOR CRYOGENIC FLUIDS
Filed Nov. 29, 1963   2 Sheets-Sheet 1

Walter H. Hogan
Arthur H. Post, Jr.
INVENTORS

BY
Attorney

Walter H. Hogan
Arthur H. Post, Jr.
INVENTORS

United States Patent Office 3,221,551
Patented Dec. 7, 1965

3,221,551
LIQUID LEVEL GAGE FOR CRYOGENIC FLUIDS
Walter H. Hogan, Wayland, and Arthur H. Post, Jr., Belmont, Mass., assignors to Arthur D. Little, Inc., Cambridge, Mass., a corporation of Massachusetts
Filed Nov. 29, 1963, Ser. No. 326,991
7 Claims. (Cl. 73—299)

This invention relates to a liquid level gage, and more particularly to a liquid level gage suitable for continuously measuring the level or volume of a cryogenic liquid within a Dewar-type vessel.

In the production and storage of cryogenic fluids it is customary to liquefy suitable cryogenic gases (e.g., air, nitrogen, oxygen, hydrogen, or helium) in an apparatus such as the now commonly used Collins helium cryostat, and then transfer the cryogenic fluid to a large Dewar-type vessel. It is also of course possible to liquefy the gas within the vessel itself. In filling a Dewar-type vessel, either from a liquefier or by liquefying directly therein, or in drawing liquid from the vessel it is highly desirable, if not essential, to be able to know at all times how much of the liquid the vessel contains. Since the construction of these Dewar-type vessels does not permit visual observation of the level of the liquid, it is necessary to have some means of making such determinations. It is not desirable to periodically insert into the liquid any type of measuring device for such devices constitute an undesirable mass requiring cool down as well as furnish a heat leak path into the liquid. Undue boil-off of the liquid is the result. It therefore becomes necessary to provide means for measuring the liquid level of cryogenic fluids in a Dewar-type vessel, the means being such that they do not introduce any unwarranted heat leak, but are such that they can continuously record for the observer the quantity of liquefied gas contained therein.

The liquid level gages presently in use depend upon thermal oscillations developed within the vessel to vibrate a diaphragm and the relation of these vibrations to calibration charts. The measurements made by such a device are not continuous, but can only be made at periodic intervals. Moreover, such devices are subject to the pressurization within the Dewar and at moderate pressures are no longer workable inasmuch as vibrations cease. Finally, cryogenic fluids, such as for example liquid helium, undergo quite marked density changes as the saturation pressure and temperature change within the vessel and these density changes are directly reflected in volume changes. This in turn means that some estimated corrections for the changes in density must be made in determining the liquid level within the Dewar to give a fair value of the volume of the cryogenic fluid in terms of atmospheric liters. There is then a clear need for an improved device which is capable of continuously and accurately measuring the volume of a cryogenic liquid within a Dewar-type vessel.

It is therefore a primary object of this invention to provide a liquid level gage for cryogenic fluids which is capable of giving a continuous reading of the volume of these fluids contained in a vessel. It is another object of this invention to provide a gage of the character described which is not influenced by pressure changes and pressure build-ups within the vessel, that is, which is capable of giving a true reading of the atmospheric volume of the cryogenic fluid contained. It is another object of this invention to provide such a gage which is not subject to plugging by contaminants and is not influenced by the insertion of a draw-off tube into the cryogenic liquid. It is another object of this invention to provide such a gage which is essentially unaffected by pressure fluctuations in the Dewar and which itself is responsible for a minimum heat leak into the Dewar. It is still another object of this invention to provide a sealing cap adapted for a Dewar which has incorporated in it the liquid level gage of this invention. Other objects of the invention will in part be obvious and will in part be apparent hereinafter.

The invention accordingly comprises the features of construction, combinations of elements, and arrangement of parts, which will be exemplified in the constructions hereinafter set forth, and the scope of the invention will be indicated in the claims.

For a fuller understanding of the nature and objects of the invention, reference should be had to the following detailed description taken in connection with the accompanying drawings in which FIG. 1 is a partial cross-section of a Dewar-type vessel showing the liquid level gage of this invention;

Figure 1:
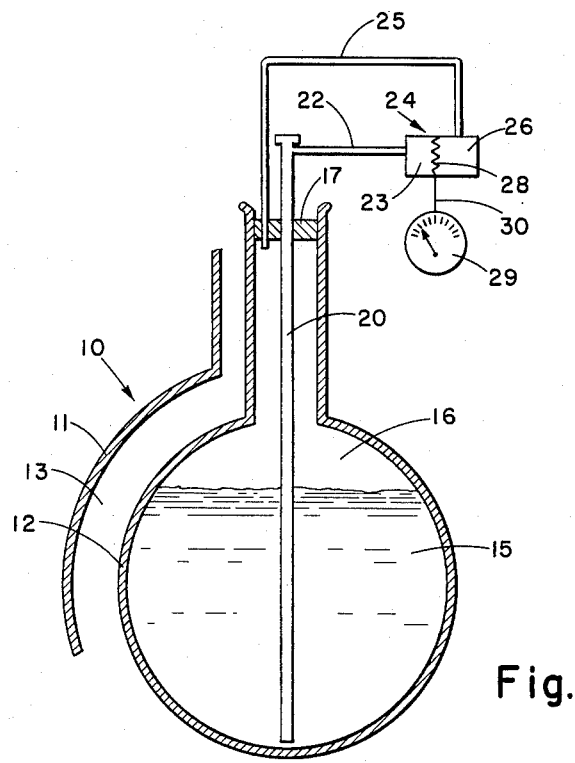

FIG. 1 illustrates the incorporation and use of the liquid level gage of this invention in a typical Dewar-type flask. No attempt is made to draw the Dewar in detail inasmuch as that is not a part of the invention. In general, the Dewar is represented by numeral 10 and can be seen to be comprised of an outer wall 11, inner wall 12 and evacuatable space 13 between these walls. Suitable spacing means (not shown) maintain the two walls in spaced relationship. The cryogenic fluid 15 is contained within the inner Dewar vessel and has above it a space 16 in which boiled-off gas accumulates and builds up a pressure. The Dewar is sealed with a suitable sealing means 17 which has in it ports permitting the introduction into the vessel of the probe element, the low-pressure line to the sensor, and a draw-off tube. It will be appreciated that such auxiliary equipment such as safety devices, pressure gages, etc., are not shown in FIG. 1 since they are not part of this invention.

The high-pressure side of the liquid level gage of this invention comprises a probe element 20 which extends to the very bottom of the Dewar vessel and a probe-sensor line 22 which communicates between the probe element 20 and the high-pressure side 23 of a pressure differential sensor 24. The low-pressure side comprises a low-pressure line 25 extending from just into the Dewar neck to the low-pressure side 26 of the sensor 24. The two sides of the sensor are in turn separated by a diaphragm 28 which is extremely sensitive to pressure changes in 23 and 26. The diaphragm in turn is connected to an indicating dial 29 through any suitable connection 30 which may be mechanical, electrical, or magnetic. It will generally be desirable to have dial 29 calibrated directly in liters of cryogenic fluid contained within the vessel. This means that the dial must be calibrated in accordance with the actual geometrical configuration of the vessel, inasmuch as the inner vessel may be spherical as shown in FIG. 1, or cylindrical, or any other suitable configuration.

The sensor may be any suitable differential pressure transducer. An example of a sensor which has been found to be particularly well suited to serve as the differential pressure sensing means is a so-called Magnehelic gage manufactured by F. W. Dwyer Manufacturing Co.

Figure 2:
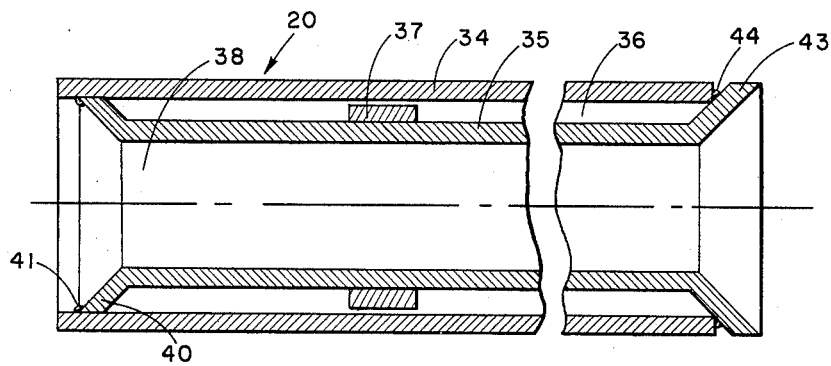
FIG. 2 is a cross-section of a portion of the probe element of the gage.

A preferred construction of the outer shield of the probe element 20 is illustrated in FIG. 2. This construction was chosen because it is inexpensive and easy to assemble. However, any construction which provides a thermally insulated shielding means which is not subject to plugging through contaminant freezing may be used as the shield. In the modification in FIG. 2, a vacuum is used as insulation, and is developed in the manner described below. The probe element shield comprises an outer tube 34 and an inner tube 35, both formed of low heat conductivity tubing, such as stainless steel. These two concentric tubes define between them an annular space 36. If desired, suitable spacer means 37 may be placed along the outer wall of the inner tube to prevent any metal-to-metal contact between the two tube walls. The spacer means 37 should also exhibit low heat conductivity and may, for example, be made of a plastic material. By forming a flange 40 at one end of inner tube 35 of such a dimension that it fits tightly within the outer tube it is possible through weld 41 to make a fluid-tight seal. In like manner, a flange 43 may be formed in the inner tube at the other end so that it extends beyond the edge of the outer tube. A comparable weld 44 seals this end. Thus the annular space 36 is a fluid-tight chamber. When the probe is introduced into the cryogenic fluid 15, as shown in FIG. 1, the inner chamber 36 is cryopumped, that is, it is cooled to a sufficiently low temperature that essentially all of the gases contained therein condense and freeze on the walls of the tubing thus creating a vacuum in space 36. This in turn then creates an efficient insulation between outer tube 34 and inner tube 35.

Figures 3, 4, 5:
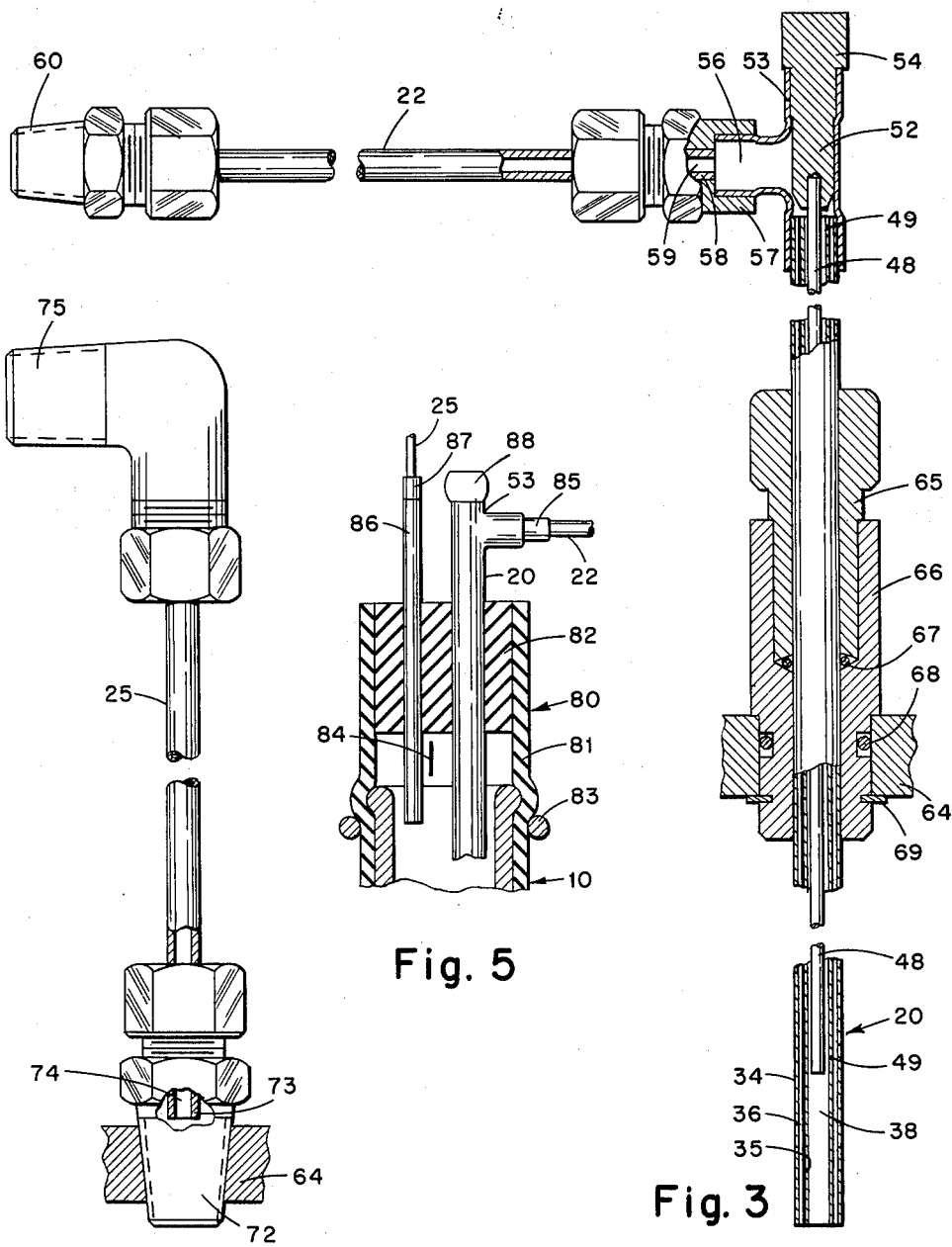
FIG. 3 is a detailed drawing partially in cross-section of the high-pressure side of the gage including the probe element and associated probe-sensor line.
FIG. 4 is a detailed drawing partially in cross-section of the low-pressure side of the device and associated sensor line.
FIG. 5 illustrates, partially in cross-section, a Dewar-cap which incorporates the gage of this device.

FIG. 3 illustrates in detail the probe element along with its connecting probe-sensor line leading to the pressure differential sensor. Within the shielding passage 38 of the probe element 20, and extending to within about one inch of its bottom end, is a copper rod 48. Copper is chosen because of its high heat conductivity, but any other material which possesses this same thermal property may be used. Between the copper rod 48 and the inner wall of the inner tube 35 of the probe shield there is an annular passage 49. It is essential that this passage be of such a size that it cannot be plugged by impurities freezing along the copper wire or along the inner wall of tubing 35. The upper end of the copper rod 48 is permanently and thermally bonded to a plug 52 which serves as a heat source. This plug in turn is fitted into a T-joint 53 and extends as a cap 54 into the atmosphere so that it might be subjected to the atmosphere's temperature. Within the T-joint 53 is a gas chamber 56, and at this point the T-joint is terminated in connecting block 57 and communicates with a narrow tubing 58 which by virtue of its capillary dimensions provides a constricted passage 59. The purpose of the constriction in the passage will be described below in connection with the description of the operation of the liquid level gage of this invention. Finally, the probe-sensor line 22 is equipped with a sensor adapter 60 which permits ready connection of the probe element and the high-pressure side 23 of the pressure differential sensor 24 (see FIG. 1).

The embodiment of the liquid level gage of this invention illustrated in FIG. 3 is shown to be mounted into a permanent fitting 64 which is at the top of the Dewar vessel. As will be shown later in conjunction with FIG. 5, it is also possible to incorporate the liquid level gage of this device in a removable sealing means which may be inserted into and removed from the top of the Dewar. In order to make the necessary fluid-tight seal of the probe element 20 with the permanent fitting 64, it is necessary to provide suitable gland pieces 65 and 66, and to use O-ring seals 67 and 68 to achieve the necessary fluid-tight connections. There is also provided a snap ring 69 which permits the permanent and accurate location of the gland member 66 within the permanent fitting 64.

FIG. 4 illustrates in detail the low-pressure line which is connected with the low-temperature side 26 of the pressure differential sensor 24. As will be seen in FIG. 4 it passes through the permanent fitting piece 64 to form a fluid-tight seal therewith through the use of an adapter fitting 72. As in the case of the high-pressure probe-sensor line, the low-pressure line 25 contains a narrow tubing 73 which defines a constriction 74 equivalent in dimensions to the constriction 59 in the probe-sensor line (see FIG. 3). Finally, the low-pressure line is completed with an adapter fitting 75 making it possible to join this low-pressure line with the low-pressure side 26 of the pressure differential sensor 24.

FIG. 5 illustrates the use of the liquid level gage of this invention in connection with a removable cap seal 80 for a Dewar. This cap seal is formed of a flexible cap 81 and a flexible sealing means 82, the probe element and low-pressure tube passing through the latter into the Dewar. A snap ring 83 is provided (if needed) to hold the flexible cap 81 in position; and there is also provided a slit 84 in the cap which will serve as a pressure relief valve should excessive pressure build up within the Dewar due to boil-off of liquid. A suitable pressure relief valve may be incorporated into the gas lines in place of the slit 84 if desired. A connector 85 is provided to the T-joint 53 of the probe element so that a suitable probe-sensor line 22 may be connected and thus join the probe element to the appropriate portion of the differential-pressure sensor. In like fashion, the low-pressure tube is formed of an extended line 86 which has a connector 87 making it possible to join this line to the low-pressure line 25 communicating with the low-pressure side of the differential pressure sensor.

It is also possible to use the liquid level gage of this invention to measure volumes of liquids other than cryogenic fluids. Since the copper rod 48 (FIG. 3) must supply a sufficient amount of heat to vaporize a small quantity of fluid it may be necessary to heat the copper rod and a heater 88 is provided for this purpose.

Thus, there is provided in the apparatus of FIG. 5 a device which is suitable for all sizes, shapes and types of Dewar vessels. It will of course be necessary either to calibrate the dial associated with the liquid level gage according to the configuration and size of the vessel, or to construct a dial which is capable of reading in inches of liquid depth and supply with it a conversion table for different types and configurations of Dewars.

It will be seen that the liquid level gage of this invention is based upon the principle of measuring a hydrostatic pressure. In its construction, it is capable of automatically accounting for pressure-produced density variations because what is being recorded by the dial is the volume of the cryogenic liquid as it would be under atmospheric conditions. This is true because it measures the weight of the column and therefore it does not suffer from the drawbacks inherent in the prior art device described above. It will be apparent that the insertion in the liquid of a relatively warm body, i.e., draw-off tube, causes violent boiling around its surface and produces a fog of the cryogenic liquid above the surface of the liquid. This will eventually condense and return to the liquid state. The gage of this invention actually records this boil-off gas which will subsequently condense as liquid, and thus gives a true measurement of the potential liquid contained within the Dewar.

A description of the operation of the liquid level gage of this invention will point up the advantages which it achieves in operation. One of the problems in designing a proble element of this nature is to prevent the rise of liquid beyond a predetermined gaging point, usually very near the bottom of the liquid. If liquid rises in the tube forming the proble element, the head which is read is less than the true head. The proble element of the gage of this invention is inserted until it touches the bottom of the Dewar vessel, as indicated in FIG. 1. As will be apparent from the detailed drawing in FIG. 3, the copper rod which serves as the means for introducing heat into the system comes within approximately one inch of the bottom of the gage (FIG. 3 is a much-enlarged drawing). Inasmuch as this copper rod is connected to a heat source which is exposed to atmospheric temperature, it is capable of conducting a small amount of heat into the probe element. As the cryogenic liquid attempts to rise in the tube of the proble element, it reaches the relative warm copper wire and is vaporized. The result is that within the tube the static pressure is equalized and holds the cryogenic fluid at a desired and stable level.

The annular flow path defined by the copper rod and the inner diameter of the inner tube making up the shielding is sufficiently large to prevent plugging by the freezing out of impurities on the side of the rod or on the inside of the tube. This means that the liquid level gage of this invention does not require any preparatory purging. The use of the two surrounding tubes of stainless steel, or other materials having low heat conductivity, and the insulating vacuum between them created in the manner described above, means that heat being conducted down through the rod is not dissipated to the cryogenic liquid. This, in effect, thermally insulates the copper heating rod and minimizes heat leak into the fluid.

Another problem which arises in devices of this nature is that a sizeable heat leak can be experienced by virtue of the establishment of thermal oscillations within a tube of this type. It is therefore necessary to prevent such thermal oscillations; and in the construction of the liquid level gage of this invention this is accomplished in two ways. First, the warm gas volume in the T-joint 53 (FIG. 3) is minimized by filling most of the T-joint with the plug 52. The second feature of the apparatus which is designed to prevent these thermal oscillations is the use of the short-length capillary tubing at the point where the T-joint 53 joins the probe-sensor line. In effect, this closes the warm volume and keeps it limited to what is in the T-joint itself, and by doing so it prevents the existence of any incipient oscillations. Finally, it is necessary to construct the device in such a way that the pressure fluctuations in the Dewar do not reach one side of the senor before the same pressure transient reaches the other side of the sensor. This difficulty is avoided in the present apparatus by the use of a restriction in the low-pressure line exactly like that in the high-pressure line so as to match the impedances of the two lines. This has been illustrated in FIG. 4.

It will be seen from the above description and drawings that there is provided a liquid level gage suitable for use in determining the volume of a cryogenic fluid within a Dewar vessel. The gage is capable of reading volumes without being influenced by internal gas pressures existing within the Dewar and hence without being influenced by the insertion into the fluid of any device which would cause violent temporary boil-off. Volumes are continuously indicated and the readings reflect the actual volume of the liquid at atmospheric conditions. The device requires no prepurging, is not subject to plugging resulting from the freezing of contaminants, and is flexible with respect to vessels with which it is used and types of information which it furnishes.

It will thus be seen that the objects set forth above, among those made apparent from the preceding description, are efficiently attained and, since certain changes may be made in the above constructions, without departing from the scope of the invention, it is intended that all matter contained in the above description or shown in the accompanying drawings shall be interpreted as illustrative and not in a limiting sense.

We claim:

1. A liquid-level gage for determining the volume of a cryogenic liquid stored under pressure in a Dewar-type vessel, comprising
   (a) a probe element adapted to be inserted into said cryogenic liquid and comprising
      (1) a thermal shielding defining a gas passage; and
      (2) a heat-conductive rod centrally located within said gas passage and thermally bonded to a heat source external of said vessel;
   (b) pressure-differential sensing means;
   (c) a first gas conduit communicating with said gas passage through a first constriction and adapted to transfer gas under a pressure determined by the hydrostatic head of said liquid to said pressure-differential sensing means, said first constriction being adapted to prevent incipient thermal oscillations in said first gas conduit;
   (d) a second gas conduit communicating through a second constriction with the top portion of said vessel above the level of said cryogenic liquid and adapted to transfer gas to said pressure-differential sensing means, said second constriction being substantially identical to said first constriction thereby to match impedances in said first and second gas conduits and to ensure that pressure fluctuations in said vessel reach said pressure-differential sensing means through said gas conduits at essentially the same time; and
   (e) indicator means associated with said sensing means and adapted to evaluate the difference in pressures of the gas transferred by said first and second conduits.

2. Liquid-level gage in accordance with claim 1 further characterized by having heater means associated with said heat conduit means external of said vessel.

3. Liquid-level gage in accordance with claim 1 wherein said pressure-differential sensing means includes a pressure-actuatable diaphragm and said diaphragm is mechanically connected to said indicator means.

4. Liquid-level gage in accordance with claim 1 wherein said thermal shielding comprises two concentric stainless steel tubes defining between them a fluid-tight annular space capable of being cryopumped when said probe element is inserted into said cryogenic fluid.

5. Liquid-level gage in accordance with claim 1 wherein said heat source is a mass of material exhibiting good heat capacity and being exposed to atmospheric conditions.

6. Liquid-level gage in accordance with claim 1 wherein said indicator means is calibrated to read equivalent liters of cryogenic liquid at atmospheric pressure.

7. Apparatus suitable for incorporation into a Dewar-type flask to provide a continuous indication of the volume of a liquid contained therein, comprising
   (a) sealing means adapted to form a fluid-tight seal with the Dewar opening;
   (b) a probe element extending through said sealing means to the bottom of said vessel, said probe element comprising
      (1) a thermal shielding defining a gas passage,
      (2) a heat-conductive rod centrally located within said gas passage and thermally bonded to a heat source external of said vessel, and
      (3) first connector means adapted to connect said gas passage through a first constriction to a first fluid line communicating with a pressure-differential sensor, said first constriction being adapted to prevent incipient thermal oscillations in said first fluid line;
   (c) gas conduit means extending through said sealing means into the top portion of said vessel above the liquid level; and
   (d) second connector means adapted to connect said gas conduit means through a second constriction to a second fluid line communicating with said pressure-differential sensor, said second constriction being substantially identical to said first constriction thereby to match impedances in said fluid lines and to ensure that pressure fluctuations in said vessel reach said pressure-differential sensor through said fluid lines at essentially the same time.

References Cited by the Examiner

UNITED STATES PATENTS

| | | | |
|---|---|---|---|
| 2,147,365 | 2/1939 | Oates | 73—299 |
| 2,525,807 | 10/1950 | Lane et al. | 73—299 X |
| 2,548,960 | 4/1951 | Edstrom | 73—301 |
| 2,609,687 | 9/1952 | Coleman | 73—299 |
| 2,623,390 | 12/1952 | Spreckmann | 73—299 |

FOREIGN PATENTS 587,032  4/1947  Great Britain.

LOUIS R. PRINCE, *Primary Examiner.*

ISAAC LISANN, *Examiner.*